(12) United States Patent
Miyashita et al.

(10) Patent No.: US 7,338,266 B2
(45) Date of Patent: Mar. 4, 2008

(54) SCREW PUMP AND METHOD OF OPERATING THE SAME

(75) Inventors: Nobuhito Miyashita, Tokyo (JP); Kozo Matake, Tokyo (JP)

(73) Assignees: Ebara Densan Ltd., Tokyo (JP); Ebara Corporation, Tokyo (JP)

( * ) Notice: Subject to any disclaimer, the term of this patent is extended or adjusted under 35 U.S.C. 154(b) by 413 days.

(21) Appl. No.: 10/519,254

(22) PCT Filed: Oct. 2, 2003

(86) PCT No.: PCT/JP03/12652

§ 371 (c)(1),
(2), (4) Date: Dec. 27, 2004

(87) PCT Pub. No.: WO2004/031585

PCT Pub. Date: Apr. 15, 2004

(65) Prior Publication Data

US 2005/0236437 A1   Oct. 27, 2005

(30) Foreign Application Priority Data

Oct. 4, 2002 (JP) .............................. 2002-292889

(51) Int. Cl.
*F04C 18/00* (2006.01)
*F04C 2/00* (2006.01)

(52) U.S. Cl. .................. 418/201.3; 418/1; 418/150; 418/201.1; 417/410.4; 310/112; 310/103

(58) Field of Classification Search .................. 418/1, 418/150, 194, 201.1, 201.3; 417/410.4; 310/112, 310/114, 103, 152

See application file for complete search history.

(56) References Cited

U.S. PATENT DOCUMENTS

| 2,511,878 | A |   | 6/1950 | Rathman |
|---|---|---|---|---|
| 2,530,173 | A | * | 11/1950 | Oldberg .................. 418/201.3 |
| 3,164,099 | A | * | 1/1965 | Iyoi ........................ 418/201.3 |
| 5,697,772 | A |   | 12/1997 | Kawamura et al. |
| 5,814,913 | A |   | 9/1998 | Ojima et al. |

FOREIGN PATENT DOCUMENTS

| GB | 112104 | 12/1917 |
|---|---|---|
| GB | 419338 | 11/1934 |
| JP | 8-149766 | 6/1996 |
| JP | 8-189485 | 7/1996 |
| JP | 8-254193 | 10/1996 |
| JP | 8-277790 | 10/1996 |
| JP | 2000-50615 | 2/2000 |
| JP | 2001-37175 | 2/2001 |

* cited by examiner

Primary Examiner—Theresa Trieu
(74) Attorney, Agent, or Firm—Westerman, Hattori, Daniels & Adrian, LLP.

(57) ABSTRACT

A screw pump includes a pair of screw rotors (2a, 2b) having teeth which are held in mesh with each other for drawing and discharging a fluid by rotating the screw rotors (2a, 2b) synchronously in opposite directions. The teeth of the screw rotors (2a, 2b) have the same shape as each other and are coiled helically in opposite directions. The teeth of the screw rotors (2a, 2b) have an axial tooth profile which allows a pair of facing teeth surfaces T of the screw rotors (2a, 2b) to be brought into contact with each other only at a pitch line P when the pair of facing teeth surfaces T are brought into contact with each other.

9 Claims, 9 Drawing Sheets

SCREW PUMP AND METHOD OF OPERATING THE SAME

TECHNICAL FIELD

The present invention relates to a screw pump having a pair of screw rotors whose teeth have the same shape as each other and extend helically in opposite directions for drawing and discharging a fluid by rotating the intermeshing screw rotors synchronously in opposite directions, and a method of operating such a screw pump.

BACKGROUND ART

Heretofore, as shown in Japanese laid-open patent publication No. 8-189,485 (hereinafter referred to as a patent publication 1), there has been known a screw machine for drawing and discharging a fluid by rotating a pair of screw rotors synchronously in opposite directions in a non-contact manner with the use of timing gears. In the patent publication 1, there has been proposed an example of a tooth profile of the screw rotor which can be easily designed and manufactured. Specifically, the respective screw rotors have teeth having the same shape as each other and extending helically in opposite directions. The tooth profile along an axial direction of the screw rotor (hereinafter referred to as an axial tooth profile) comprises an outer circumferential section and a tooth root section which extend straightly with the same length and are located apart from a pitch line by an equal distance, and two curves interconnecting the outer circumferential section and the tooth root section. One of the two curves has point symmetry with respect to a pitch point where the above curve crosses the pitch line, and interconnects the outer circumferential section and the tooth root section smoothly. The other curve is defined by a trochoid curve generated by a point on an outer circumferential surface of the companion screw rotor in a transverse (normal-to-axis) cross section of the screw rotor.

In Japanese laid-open patent publication No. 9-324,780 (hereinafter referred to as a patent publication 2), there has been proposed a screw machine having two pairs of screw rotors which are fixed to two rotating shafts and are driven synchronously in opposite directions by a two-axis synchronous brushless DC motor without using the timing gears.

The screw machine disclosed in the patent publication 1 requires the timing gears for rotating the screw rotors synchronously in the opposite directions in a non-contact manner. On the other hand, in the screw machine disclosed in the patent publication 2, the screw rotors can be rotated synchronously in the opposite directions without using the timing gears because of magnetic coupling of the two-axis synchronous brushless DC motor. However, in both cases, the screw rotors are brought into contact with each other due to disturbance such as sudden fluctuation of a discharge pressure of the screw machine. In such a case, with the conventional tooth profile, the screw rotors are brought into contact with each other not only at the pitch line but also at other points. Accordingly, contact portions of the screw rotors are moved relative to each other, there by causing heat generation and wear of the contact portions. Further, the screw rotors are brought into intense contact with each other to cause the rotations of the screw rotors to be restrained. Therefore, in the case where the magnetic coupling is used to rotate the screw rotors synchronously in the opposite directions, a clearance between the screw rotors is required to be larger compared to the case where the timing gears are used, thus causing a performance of the screw machine to be lowered.

DISCLOSURE OF INVENTION

The present invention has been made in view of the above drawbacks. It is therefore an object of the present invention to provide a screw pump which can increase a pump performance with a small clearance between screw rotors, and can prevent the screw rotors from being worn and restrained even when the screw rotors are brought into contact with each other, and to provide and a method of operating such a screw pump.

In order to achieve the above object, according to one aspect of the present invention, there is provided a screw pump, comprising: a pair of screw rotors having teeth which are held in mesh with each other for drawing and discharging a fluid by rotating the screw rotors synchronously in opposite directions, the teeth of the screw rotors having the same shape as each other and being coiled helically in opposite directions; wherein the teeth of the screw rotors have an axial tooth profile which allows a pair of facing teeth surfaces of the screw rotors to be brought into contact with each other only at a pitch line when the pair of facing teeth surfaces are brought into contact with each other.

In a preferred aspect of the present invention, the axial tooth profile comprises an outer circumferential section, a tooth root section, and two interconnecting sections for interconnecting the outer circumferential section and the tooth root section, the outer circumferential section and the tooth root section are located apart from the pitch line by a substantially equal distance, respectively, and one of the two interconnecting sections comprises an inclined-line which inclines with respect to a direction perpendicular to an axial direction of the screw rotor in such a manner that a tooth width of the screw rotor becomes smaller from the tooth root section toward the outer circumferential section.

In a preferred aspect of the present invention, a gradient of the inclined-line in a region from the pitch line to the outer circumferential section is larger than a gradient of the inclined-line in a region from the tooth root section to the pitch line.

In a preferred aspect of the present invention, the teeth of the screw rotors have a transverse tooth profile including a trochoid curve generated by a point on an outer circumferential surface of the screw rotor at companion side, or a curve similar to the trochoid curve, and the other of the two interconnecting sections corresponds to the trochoid curve or the curve similar to the trochoid curve.

In the above intermeshing screw rotors, when one of the screw rotors is driven while a distance between two axes of the respective screw rotors is kept constant so as to form a predetermined clearance between the outer circumferential section and the tooth root section which face each other, the two screw rotors are brought into contact with each other in the following two manners:

1) A first manner is that the tooth surfaces comprising the trochoid curves (hereinafter referred to as trochoid surfaces) are brought into contact with each other. However, since the trochoid curve is generated by the point on the outer circumferential surface of the companion screw rotor (i.e. the other one of the two screw rotors), it is impossible to bring the trochoid surfaces into contact with each other only at the pitch line. Therefore, it is required to prevent the trochoid surfaces from being brought into contact with each other, and hence it is required to form a predetermined clearance between the trochoid surfaces. Because the trochoid surfaces are arranged out of contact with each other, a strict trochoid curve is not necessarily required, and a curve similar to the trochoid curve may be used.

2) A second manner is that the tooth surfaces comprising the inclined-lines (hereinafter referred also to as taper surfaces) are brought into contact with each other. With the conventional tooth profile, since the inclined-line has point symmetry with respect to a pitch point where the inclined-line crosses the pitch line, these taper surfaces are brought into contact with each other at the entire length of the inclined-line. Accordingly, contact portions of the taper surfaces are moved relatively to each other, thus causing heat generation and wear of the contact portions. Therefore, a predetermined clearance is formed between the taper surfaces so that the taper surfaces are held out of contact with each other completely. In the present invention, a shape of the taper surface, i.e. the inclined-line, is modified. Specifically, the gradient of the inclined-line in a region from the pitch line to the outer circumferential section is slightly larger than the gradient of the inclined-line in a region from the tooth root section to the pitch line. With this shape, the taper surfaces are brought into contact with each other only at the pitch line. Since the contact portions of the screw rotors at the pitch line are not moved relatively to each other, no heat generation is caused. Further, a driving force can be transmitted from one of the two screw rotors to the other (i.e. the companion screw rotor) through the above contact portions, and hence the screw rotors can be rotated synchronously in the opposite directions.

As described above, according to the present invention, it is possible to utilize the contact of the taper surfaces positively. For example, in the case of a small pump having a low discharge pressure and requiring a small driving force, it is possible to drive only one of the screw rotors to rotate the other through a rolling contact between the taper surfaces without using the timing gears. Even in the case where the screw rotors are required to be held out of contact with each other, the clearance between the taper surfaces can be smaller compared to the conventional screw rotors. Specifically, even if the screw rotors are brought into contact with each other, the taper surfaces are brought into rolling contact with each other as described above, and hence the clearance between the taper surfaces can be set to be small. Therefore, the pump performance can be increased.

In a preferred aspect of the present invention, a screw pump further comprises a pair of rotating shafts to which the screw rotors are fixed; and a pair of magnet rotors attached to the rotating shafts; wherein the magnet rotors have the same number of magnetic poles as each other, and the magnet rotors are arranged such that unlike magnetic poles of the respective magnet rotors attract each other.

As described above, according to the present invention, it is possible to perform a so-called traction drive in which the only one of the screw rotors is driven to rotate the other through the rolling contact between the taper surfaces. However, a large driving force is required due to a rolling friction compared to a non-contact drive. Therefore, the magnet rotors are provided as a mechanism for rotating a pair of the screw rotors synchronously and smoothly in the opposite directions without using the timing gears, thereby enabling the driving force to be small even in the case of the traction drive.

In a preferred aspect of the present invention, a screw pump further comprises: plural-phase armatures having cores and windings and being disposed radially outwardly of at least one of the magnet rotors; wherein at least one of the magnet rotors is driven by switching currents flowing to the armatures so that the screw rotors are rotated synchronously in the opposite directions.

According to the present invention, at least one of the magnet rotors is driven as a brushless DC motor, and hence the pair of screw rotors can be rotated synchronously in the opposite directions in cooperation with the magnetic coupling of the magnet rotors.

As disclosed in the above patent publication 2, there has been known a screw machine having a two-axis synchronous brushless DC motor for rotating screw rotors synchronously in the opposite directions without using the timing gears. In contrast thereto, the screw pump according to the present invention can perform the traction drive, and hence such a two-axis synchronous brushless DC motor is not necessarily used to drive both of the magnet rotors. Therefore, it is possible to constitute a drive source, i.e. brushless DC motor, having a simple structure with the use of a part of the magnetic poles formed on outer circumferential surfaces of the magnet rotors. For example, one of the magnet rotors may be extended in an axial direction thereof to form an extended portion and armatures may be disposed in the vicinity of an outer circumferential surface of the extended portion of the magnet rotor.

In a preferred aspect of the present invention, a screw pump further comprises: a pair of rotating shafts to which the screw rotors are fixed; and plural pairs of magnet rotors attached to the rotating shafts; wherein the magnet rotors have the same number of magnetic poles as each other with respect to each pair of the magnet rotors, and the plural pairs of the magnet rotors are arranged such that unlike magnetic poles of the respective magnet rotors attract each other.

When the screw rotors are required to be held out of contact with each other, the magnetic coupling is required to be enhanced. According to the present invention, one or more pairs of the magnet rotors can be provided in addition to the magnet rotors constituting the drive source. Therefore, the magnetic coupling can be enhanced, and hence the screw rotors can be rotated in a non-contact manner.

According to another aspect of the present invention, there is provided a method of operating a screw pump having a pair of screw rotors whose teeth have the same shape as each other and are coiled helically in opposite directions, comprising: bringing a pair of facing teeth surfaces of said screw rotors into contact with each other only at a pitch line; and rotating said screw rotors synchronously in opposite directions so as to draw and discharge a fluid.

BEST MODE FOR CARRYING OUT THE INVENTION

Figure 1:
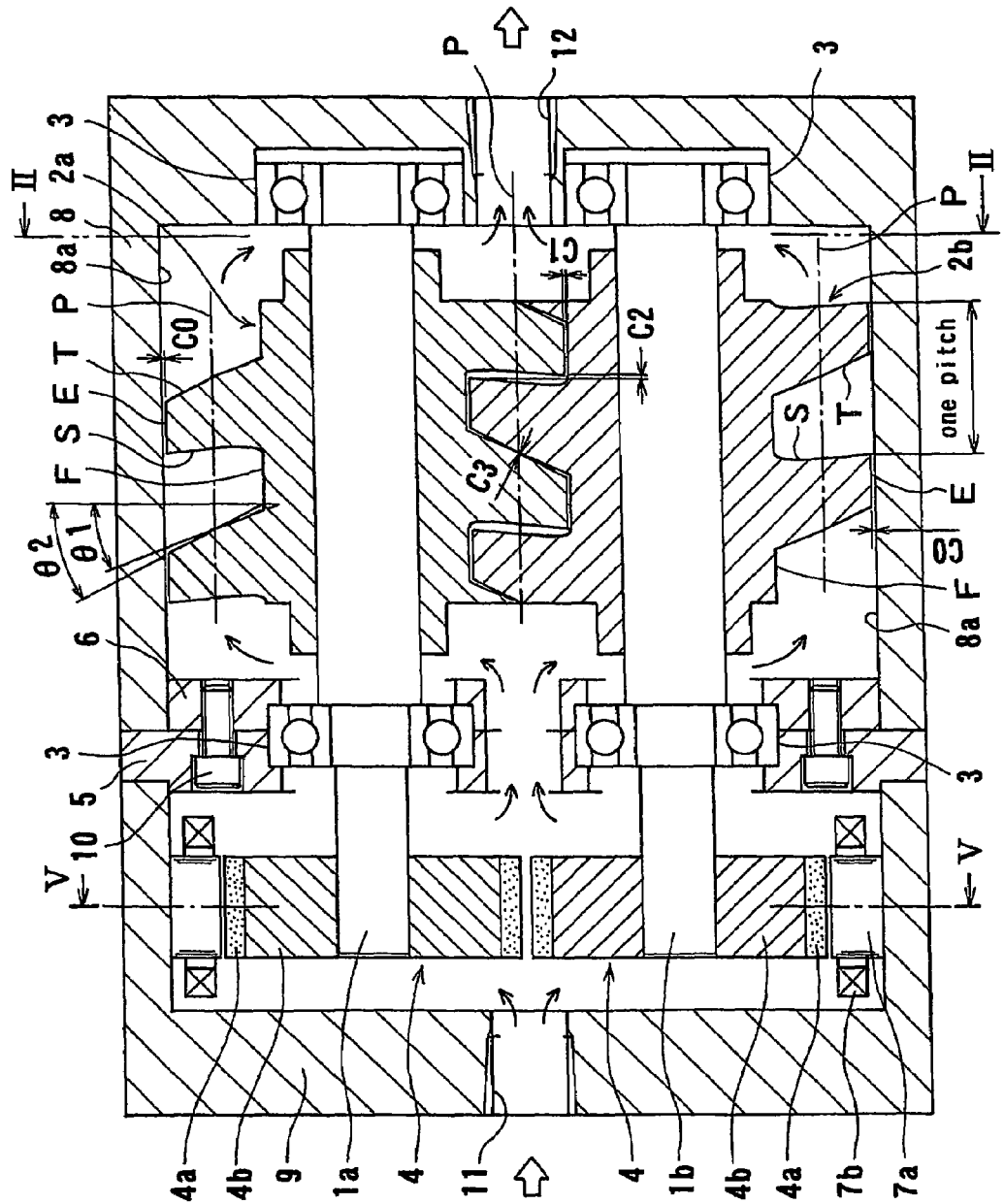
FIG. 1 is an axial cross-sectional view showing a screw pump according to a first embodiment of the present invention.
Figure 2:
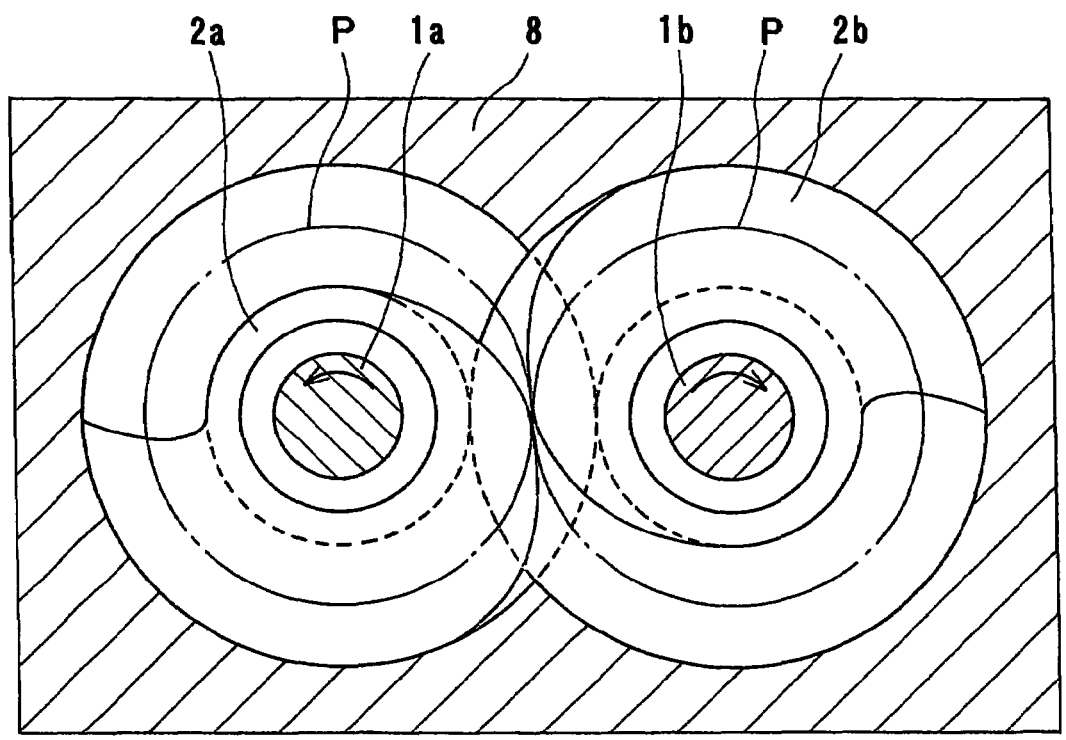
FIG. 2 is a cross-sectional view taken along line II-II of FIG. 1.

A screw pump (screw blower) according to embodiments of the present invention will be described below with the reference to the attached drawings. FIG. 1 is an axial cross-sectional view showing a screw pump according to a first embodiment of the present invention. FIG. 2 is a cross-sectional view taken along line II-II of FIG. 1

As shown in FIG. 1, two rotating shafts 1a, 1b are disposed in parallel to each other in a pump casing 8, and are rotatably supported by bearings 3. A screw rotor 2a having a right-hand screw tooth is fixed to the rotating shaft 1a, and a screw rotor 2b having a left-hand screw tooth is fixed to the rotating shaft 1b. The screw rotors 2a, 2b are arranged in parallel to each other and are located between the bearings 3 which support the rotating shafts 1a, 1b. A pair of magnet rotors 4 is fixed to end portions of the rotating shafts 1a, 1b, and is housed in a motor casing 9. The motor casing 9 has an inlet port 11, and the pump casing 8 has an outlet port 12. The outlet-side bearings 3 are fixed to the pump casing 8, and the inlet-side bearings 3 are fixed to a bearing housing 5 by a bearing-fixing member 6 and bolts 10. The bearing housing 5 is fixed to the pump casing 8 by bolts or the like (not shown).

Figure 3A:
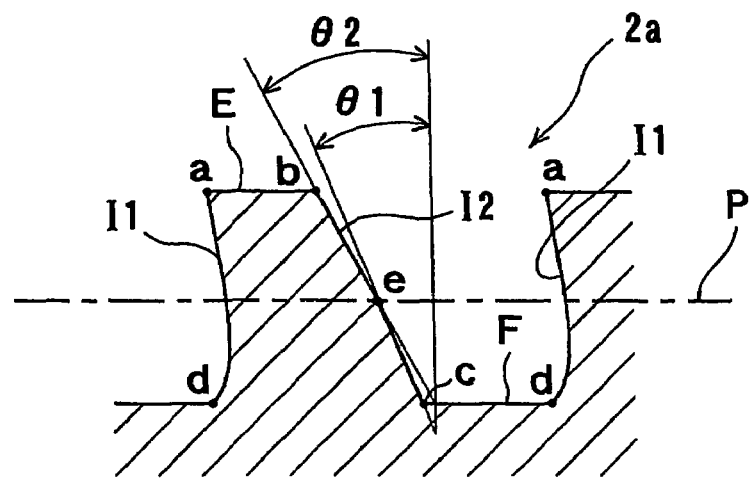
FIG. 3A is an enlarged cross-sectional view showing a tooth of a screw rotor in FIG. 1.
Figure 3B:
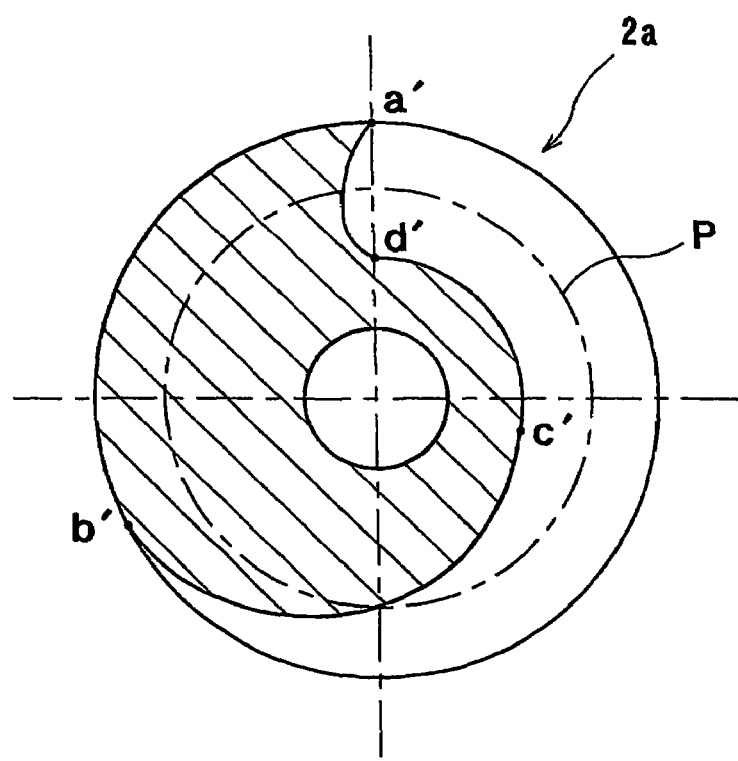
FIG. 3B is a transverse cross-sectional view showing the screw rotor in FIG. 1.
Figure 4A:
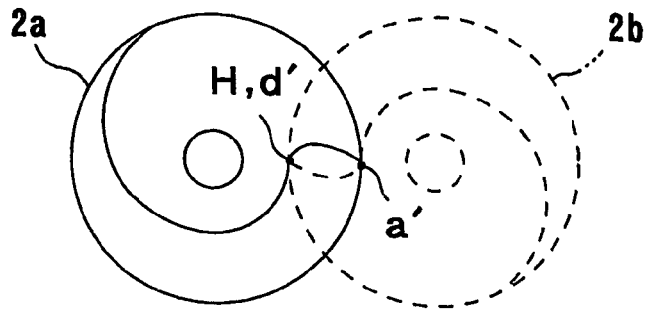
FIGS. 4A through 4D are views illustrating the manner in which a trochoid curve is generated.
Figure 4B:
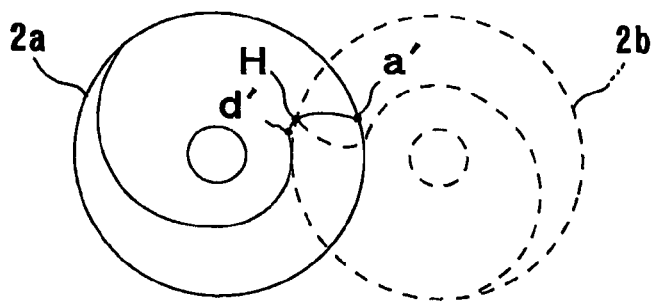
Figure 4C:
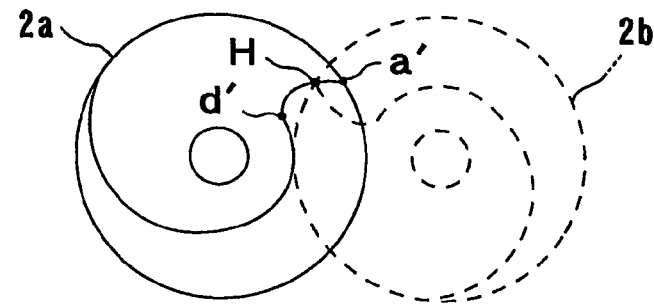
Figure 4D:
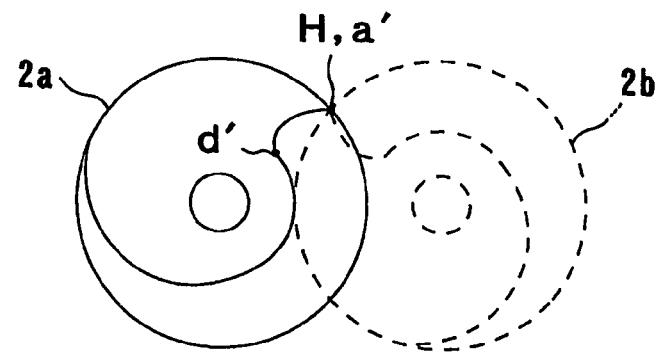

FIG. 3A is an enlarged cross-sectional view showing a tooth of the screw rotor in FIG. 1, and FIG. 3B is a transverse cross-sectional view showing the screw rotor in FIG. 1.

As shown in FIG. 3A, the right-hand screw tooth of the screw rotor 2a has an axial tooth profile (i.e. a tooth profile along an axial direction of the screw rotor 2a) comprising an outer circumferential section E (a-b), a tooth root section F (c-d), a first interconnecting section I1 (d-a) for interconnecting the outer circumferential section E and the tooth root section F, and a second interconnecting section I2 (c-b) for interconnecting the outer circumferential section E and the tooth root section F. A pitch line P is positioned between the outer circumferential section E and the tooth root section F. The outer circumferential section E and the tooth root section F have substantially the same length as each other, and are located apart from the pitch line P by a substantially equal distance, respectively. The outer circumferential section E (a-b), the tooth root section F (c-d), the first interconnecting section I1 (d-a), and the second interconnecting section I2 (c-b) shown in FIG. 3A correspond respectively to a curve a'-b', a curve c'-d', a curve d'-a', and a curve c'-b' shown in FIG. 3B. The curve a'-b' and the curve c'-d' comprise a circular arc extending around an axial center of the screw rotor 2a, respectively. The transverse cross-section shown in FIG. 3B shows a transverse tooth profile, i.e. a normal-to-axis tooth profile, of the screw rotor 2a.

In the transverse cross-section shown in FIG. 3B, the curve d'-a' corresponding to the first interconnecting section I1 (d-a). comprises a trochoid curve generated by a point on an outer circumferential surface of the companion screw rotor 2b. Alternatively, the curve d'-a' may comprise a curve similar to the trochoid curve. FIGS. 4A through 4D are views illustrating the manner in which the trochoid curve is generated. As shown in FIGS. 4A through 4D, when the screw rotors 2a, 2b are rotated synchronously in opposite directions, a point H on the outer circumferential surface of the screw rotor 2b is moved on a tooth surface of the screw rotor 2a to generate the trochoid curve, i.e. the curve d'-a'. In this manner, the curve d'-a' is defined by the trochoid curve generated on the tooth surface of the screw rotor 2a. In FIG. 1, a symbol S represents a trochoid surface comprising the curve d'-a'.

In the axial tooth profile shown in FIG. 3A, the second interconnecting section I2 comprises a line (an inclined-line) c-b which inclines with respect to a direction perpendicular to an axial direction of the screw rotor 2a in such a manner that a tooth width becomes smaller from the tooth root section F toward the outer circumferential section E. The line c-b comprises a straight line c-e and a straight line e-b. Specifically, the line c-b, i.e. the second interconnecting section I2, comprises the straight line c-e extending from the tooth root section F to the pitch line P and inclining at an angle of θ1, and the straight line e-b extending from the pitch line P to the outer circumferential section E and inclining at an angle of θ2 which is slightly larger than θ1. The angles of θ1, θ2 are defined as gradients of the straight lines c-e and e-b with respect to the direction perpendicular to the axial direction of the screw rotor 2a. In FIG. 1, a symbol T represents a taper surface comprising the second interconnecting section I2. With this structure having such a taper surface T, the tooth width at the outer circumferential section E is necessarily smaller than that at the tooth root section F. The tooth width is a thickness of the tooth of the screw rotor 2a and is defined by a distance between the first interconnecting section I1 and the second interconnecting section I2 in the axial direction of the screw rotor 2a. The left-hand screw tooth of the screw rotor 2b also has the same tooth profile as the right-hand screw tooth of the screw rotor 2a.

As shown in FIG. 1, a small clearance C0 is formed between the respective outer circumferential sections E of the screw rotors 2a, 2b and an inner circumferential surface 8a of the pump casing 8 so that the screw rotors 2a, 2b can be rotated in the pump casing 8 in a non-contact manner. The right-hand screw tooth of the screw rotor 2a and the left-hand screw tooth of the screw rotor 2b are held in mesh with each other at facing portions of the screw rotors 2a, 2b. Generally, in order to allow the screw rotors 2a, 2b to be held out of contact with each other, it is necessary to form a clearance C1 between the outer circumferential section E and the tooth root section F, a clearance C2 between the trochoid surfaces S, and a clearance C3 between the taper surfaces T.

The present invention is characterized by a shape of the taper surface T (axial tooth profile). With this taper surface T having the shape defined by the second interconnecting section I2, the respective taper surfaces T of the screw rotors 2a, 2b are brought into contact with each other only at the pitch line P. At the pitch line P, the taper surfaces T of the screw rotors 2a, 2b are moved at the same speed (a relative speed of 0), and hence the screw rotors 2a, 2b can be brought into rolling contact with each other. Therefore, the screw rotors 2a, 2b are rotated synchronously and smoothly in the opposite directions through the rolling contact. In this embodiment, the second interconnecting section I2 constituting the taper surface T comprises a combination of the two straight lines c-e and e-b. Alternatively, the second interconnecting section I2 may comprise a single curve inclining in such a manner that a gradient of the curve increases gradually from the tooth root section F toward the outer circumferential section E, or may comprise a combination of a straight line and a curve.

Figure 9:
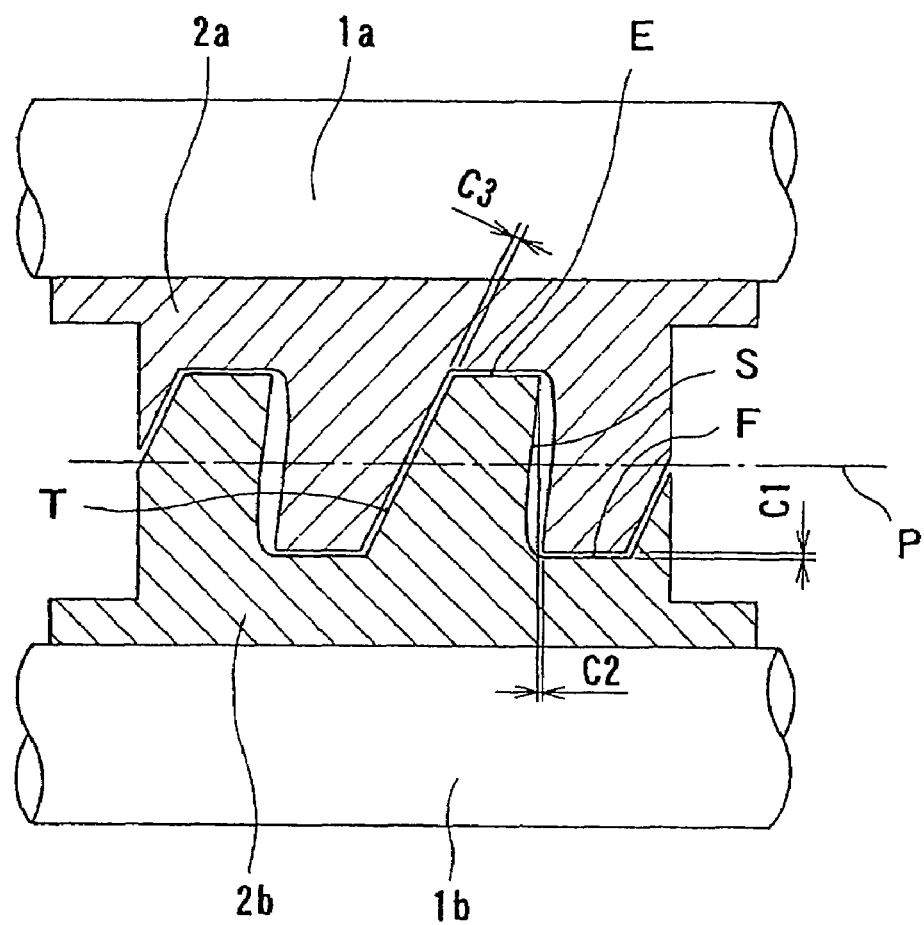
FIG. 9 is a cross-sectional view showing screw rotors which have a conventional tooth profile and are held in mesh with each other.

In FIG. 1, the screw rotors 2a, 2b are assembled in such a state that the taper surfaces T are held in contact with each other, that is, the clearance C3 is not formed. FIG. 9 is a cross-sectional view showing conventional screw rotors. As shown in FIG. 9, in the conventional screw rotors, it is required to form the clearance C2 between the trochoid surfaces S and the clearance C3 between the taper surfaces T. Further, it is also required to manage magnitudes of the clearance C2 and the clearance C3. In contrast thereto, in this embodiment of the present invention, since the clearance C3 is not formed and the taper surfaces T are brought into contact with each other only at the pitch line P, the magnitude of the clearance C2 is necessarily determined. Therefore, the screw rotors 2a, 2b can be assembled easily and the pump performance can be stabilized and increased. In this manner, with no clearance C3, the clearance C2 is kept constant, and hence the trochoid surfaces S can be held out of contact. Therefore, the curve d'-a' which constitutes the trochoid surface S is not required to be a strict trochoid curve, but may be a curve similar to the trochoid curve. The screw rotors 2a, 2b are preferably made of a resin such as a polyamide-imide resin containing a carbon which has an excellent heat resistance and wear resistance. In the case where the screw rotors 2a, 2b are made of a resin, the screw rotors 2a, 2b can be self-lubricated, and a loudness level of a contact-sound of the taper surfaces T can be lowered.

Figure 5:
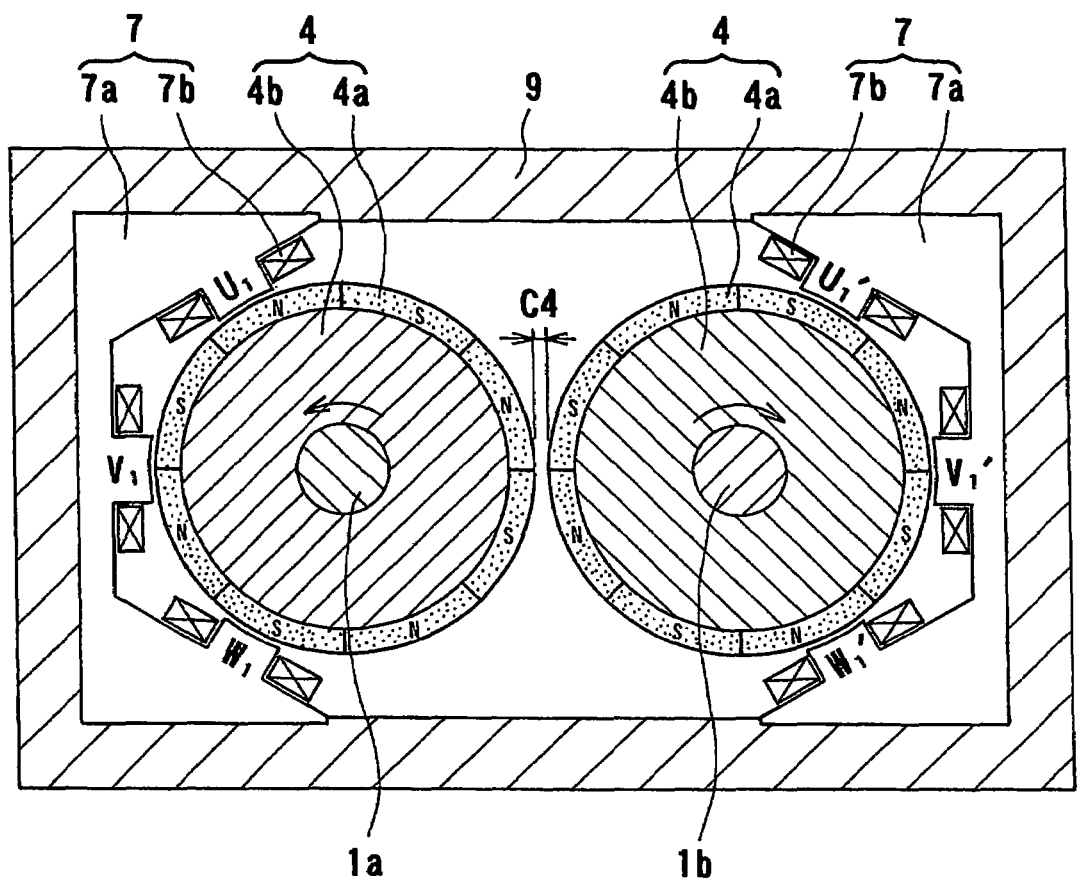
FIG. 5 is a cross-sectional view taken along line V-V of FIG. 1.

FIG. 5 is a cross-sectional view taken along line V-V of FIG. 1. As shown in FIG. 5, the magnet rotors 4 have the same structure as each other and are arranged in parallel to each other. Each of the magnet rotors 4 has a yoke 4b made of a magnetic material and a ring-shaped magnet 4a attached to an outer circumferential surface of the yoke 4b. The magnet 4a is polarized to have eight magnetic poles, thus forming eight magnetic poles on outer circumferential surfaces of the respective magnet rotors 4. Although the number of the magnetic poles of the magnet rotors 4 is eight in this embodiment, the above number can be set to be an even number (2n:n=1, 2, . . . ). The magnet rotors 4 are arranged such that unlike magnetic poles of the respective magnet rotors 4 attract each other and a clearance C4 is formed between the magnet rotors 4. The screw rotors 2a, 2b which have been assembled as shown in FIGS. 1 and 2 can be rotated synchronously and smoothly in the opposite directions by the magnetic coupling of the magnet rotors 4 while keeping the clearances C0, C1 and C2. If the synchronism of the rotation of the screw rotors 2a, 2b is required to be enhanced, plural pairs of magnet rotors may be attached to the rotating shafts 1a, 1b instead of providing only one pair of the magnet rotors.

With the above structure of this embodiment, it is possible to constitute the screw pump capable of being operated stably with no timing gears. Because no timing gears are required, lubricating oil is not required, and noise and loss of the driving force due to the timing gears are not caused. Further, since the length of the screw pump in the axial direction thereof can be shortened, the screw pump can be made compact.

Generally, there are several methods for driving the screw pump. A two-axis synchronous brushless DC motor as disclosed in the patent publication 2 may be used, or a typical type of a single-axis-drive motor may be coupled to the rotating shaft 1a (or 1b). As shown in FIG. 5, the screw pump of this embodiment employs a driving method which uses three-phase (U, V, W) armatures 7 comprising cores 7a and windings 7b which are disposed in the vicinity of the outer circumferential surfaces of the respective magnet rotors 4. Two sets of three-phase armatures 7 are arranged at positions opposite to the facing portions of the magnet rotors 4, respectively. With this arrangement, the attraction between the magnet rotors 4 themselves can be canceled by the attraction between the magnet rotors 4 and the cores 7a. The respective phases of armatures 7 are arranged around the rotating shafts 1a, 1b, respectively, at angularly equal intervals of 60°.

Figure 6A:
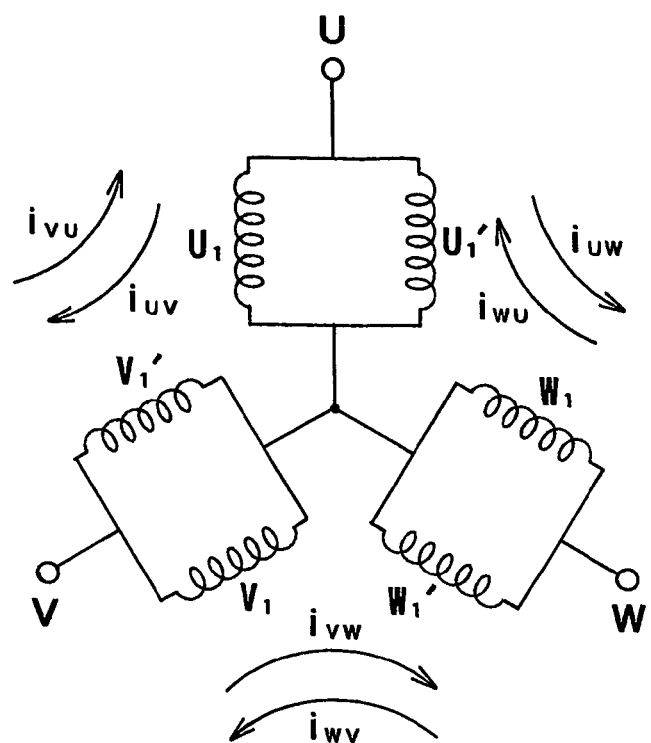
FIG. 6A is a connection diagram illustrating the manner in which both of the two magnet rotors are driven simultaneously.
Figure 6B:
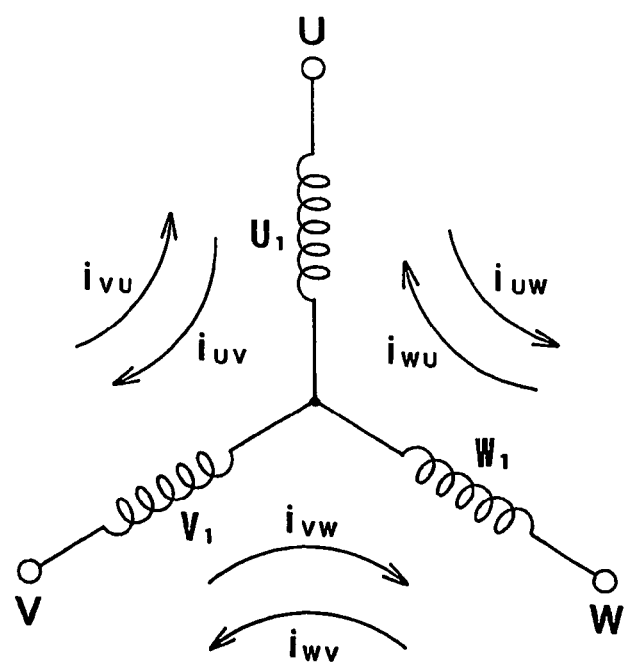
FIG. 6B is a connection diagram illustrating the manner in which one of the two magnet rotors is driven.

The three-phase windings 7b ($U_1$, $V_1$, $W_1$, $U_1'$, $V_1'$ and $W_1'$) are connected as shown in FIG. 6A, and the two magnet rotors 4 and the two sets of armatures 7 constitute a single brushless DC motor. FIG. 6A is a connection diagram illustrating the manner in which both of the two magnet rotors 4 are driven simultaneously, and shows that the brushless DC motor of this embodiment is a type of two-axis synchronous brushless DC motor. The windings $U_1'$, $V_1'$ and $W_1'$ are coiled in directions opposite to directions in which the windings $U_1$, $V_1$ and $W_1$ are coiled. In FIG. 6A, symbols $i_{uv}$, $i_{vw}$, $i_{wu}$, $i_{vu}$, $i_{wv}$ and $i_{uw}$ represent currents flowing through the windings 7b ($U_1$, $V_1$, $W_1$, $U_1'$, $V_1'$ and $W_1'$), respectively. FIG. 6B is a connection diagram illustrating the manner in which one of the two magnet rotors 4 is driven. In this manner, only one of the two magnet rotors 4 maybe driven. In both cases, a motor driver shown in FIG. 7 is used to drive the magnet rotors (magnet rotor) 4 by switching the six patterns of the currents $i_{uv}$, $i_{vw}$, $i_{wu}$, $i_{vu}$, $i_{wv}$ and $i_{uw}$ to be supplied in accordance with positions of the magnetic poles of the magnet rotors (magnet rotor) 4.

Figure 7:
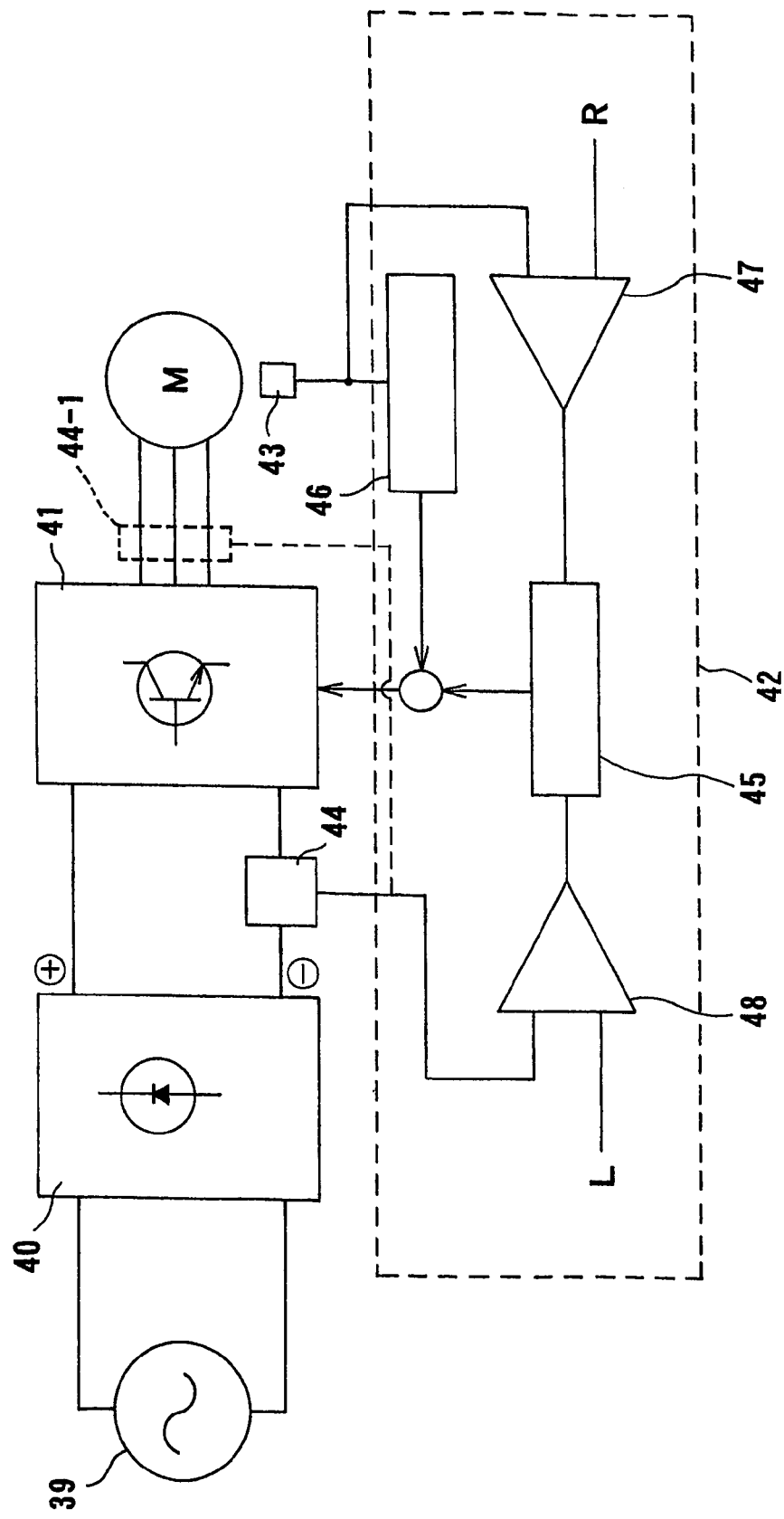
FIG. 7 is a schematic view showing a motor driver for driving a brushless DC motor incorporated in the screw pump according to the first embodiment of the present invention.

FIG. 7 is a schematic view showing the motor driver for driving the brushless DC motor. In FIG. 7, the brushless DC motor M comprises the magnet rotors 4 and the armatures 7 (see FIG. 5). As shown in FIG. 7, the motor driver for driving the brushless DC motor M comprises a rectification circuit 40 for rectifying the current from a power source 39, a switching circuit 41, and a controller 42 for controlling the brushless DC motor M through the switching circuit 41. The controller 42 comprises a sensor 43 for detecting the positions of the magnetic poles and a rotational speed of the magnet rotors 4, a sensor 44 for monitoring the current from the rectification circuit 40, a PWM controller 45 which sends a pulse-width-modulation signal to the switching circuit 41, a current-flow controller 46 which sends a current-flow-switching signal based on the positions of the magnetic poles of the magnet rotors 4 to the switching circuit 41 in accordance with a predetermined pattern, and a comparator 47 for comparing an output signal of the sensor 43 with a rotational-speed criterion R which is set in advance. A sensor for detecting the positions of the magnetic poles of the magnet rotors 4 and a sensor for detecting the rotational speed of the magnet rotors 4 may be provided separately.

The output signal of the sensor 43 is sent to the PWM controller 45 through the comparator 47. The PWM controller 45 generates the pulse-width-modulation signal based on a deviation between the rotational speed of the magnet rotors 4 (the brushless DC motor M) and the rotational-speed criterion R. The pulse-width-modulation signal is sent to the switching circuit 41, and at the same time, the current-flow-switching signal-is sent from the current-flow controller 46 to the switching circuit 41. Accordingly, a pulse current flows to the brushless DC motor M in accordance with the predetermined pattern.

Generally, a large torque is required to rotate the screw rotors 2a, 2b (see FIG. 1) at the time of starting the screw pump. The controller 42 controls the brushless DC motor M so as to be rotated at a constant rotational speed. Accordingly, the excessive current flows to the brushless DC motor M at the time of starting the screw pump, thus causing problems such as heat generation in the brushless DC motor M. Therefore, in order to avoid such problems, a comparator 48 is provided for comparing an output signal of the sensor 44 with a preset current-limitation criterion L so as to prevent the current over the current-limitation criterion L from flowing to the brushless DC motor M. A sensor 44-1 may be provided between the switching circuit 41 and the brushless DC motor M so that current flowing to the brushless DC motor is monitored by the sensor 44-1. In this manner, the controller 42 performs a rotational-speed control and a current control which are switched based on the output signals of the sensors 43, 44.

In FIG. 1, the motor casing 9 covers the magnet rotors 4, the cores 7a, and the windings 7b, and is fixed to the bearing housing 5 by bolts or the like (not shown). The motor casing 9 having the inlet port 11 and the pump casing 8 having the outlet port 12 constitute a pump unit casing. With this structure, it is advantageous that the magnet rotors 4 and the windings 7b are cooled by a gas drawn through the inlet port 11.

Figure 8:
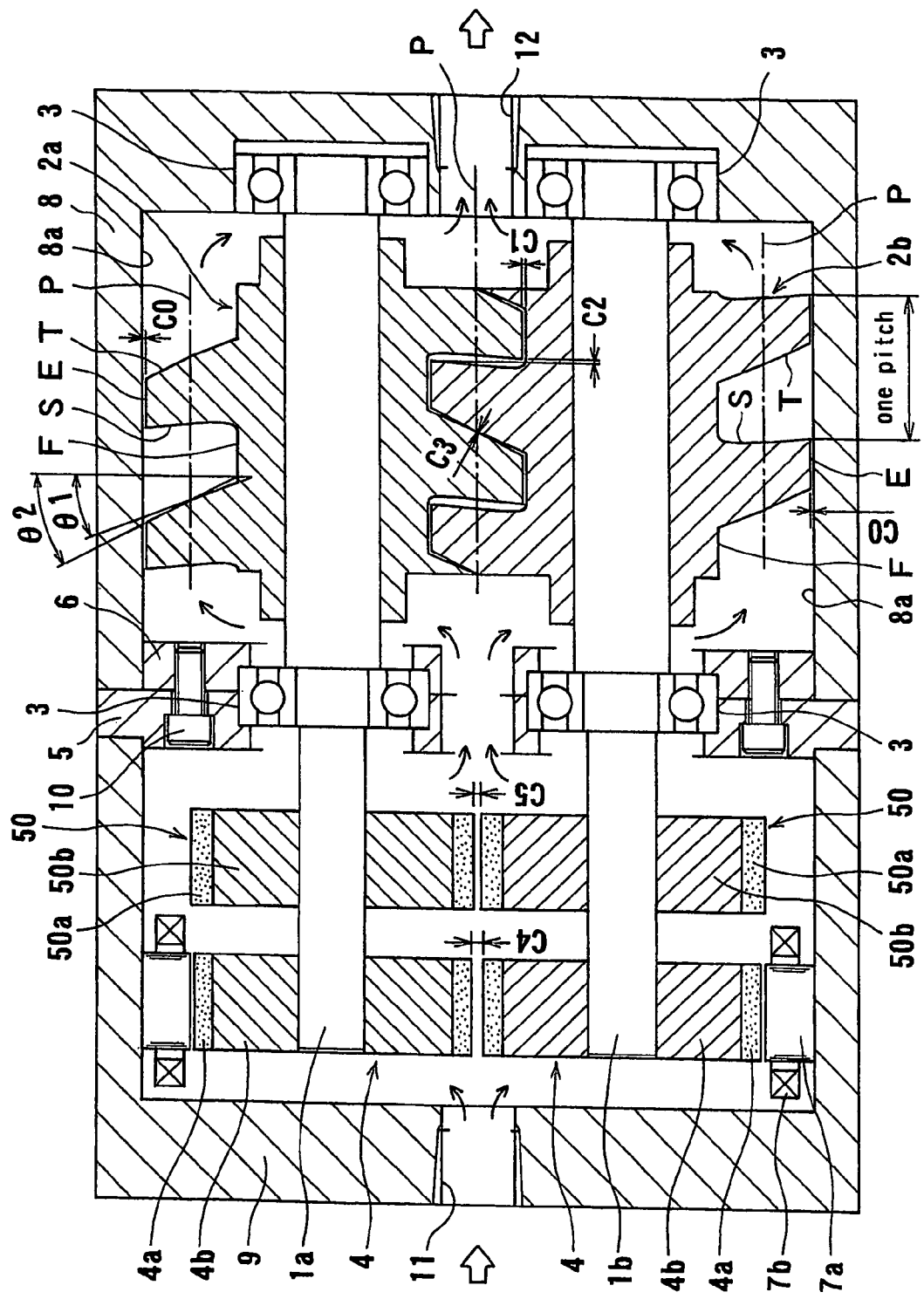
FIG. 8 is an axial cross-sectional view showing a screw pump according to a second embodiment of the present invention.

Next, a screw pump (screw blower) according to a second embodiment of the present invention will be described with reference to FIG. 8. FIG. 8 is an axial cross-sectional view showing the screw pump according to the second embodiment of the present invention. The basic structure of this embodiment is the same as that of the first embodiment, and will not be described in detail below.

As shown in FIG. 8, a pair of magnet rotors (second magnet rotors) 50 is fixed to the rotating shafts 1a, 1b at a position between the magnet rotors (first magnet rotors) 4 and screw rotors 2a, 2b. The magnet rotors 50 have the same basic structure as the magnet rotors 4. Specifically, each of the magnet rotors 50 comprises a yoke 50b, and a magnet 50a fixed to an outer circumferential surface of the yoke 50b. In order to rotate the screw rotors 2a, 2b synchronously and more smoothly, it is preferable that the number of magnetic poles of the magnet rotors 50 is larger than that of the magnet rotors 4. Specifically, the number of magnetic poles of each of the magnet rotors 50 is preferably set to be m+2n (m=the number of magnetic poles of the magnet rotor 4, and n=1, 2, . . . ). From such a view point, the magnet rotors 50 have 14-magnetic poles, respectively. Further, in order to enhance the magnetic coupling, it is preferable that a clearance C5 between the magnet rotors 50 is as small as possible. In this embodiment, the clearance C5 is set to be smaller than the clearance C4 between the magnet rotors 4.

With this structure, the magnetic coupling can be enhanced by providing the magnet rotors 50 in addition to the magnet rotors 4 which drive the screw rotors 2a, 2b, thus enabling the screw rotors 2a, 2b to be rotated synchronously and smoothly in the opposite directions. Further, since two pairs of the magnet rotors 4, 50 are provided to reduce the driving force, it is not required to bring the screw rotors 2a, 2b into contact with each other so as to transmit the driving force. Therefore, the screw rotors 2a, 2b can be disposed out of contact with each other. In this case, the screw rotors 2a, 2b can be made of metal such as aluminum. In this embodiment also, even if the screw rotors 2a, 2b are brought into contact with each other, the taper surfaces T of the screw rotors 2a, 2b are brought into contact with each other only at the pitch line P. Therefore, it is possible to prevent heat generation and wear of the screw rotors 2a, 2b from occurring. Although two pairs of the magnet rotors 4, 50 are provided in this embodiment, three or more pairs of magnet rotors may be provided.

The screw pump according to the present invention can be used in applications not only for evacuating a gas as with the case of the above embodiments, but also for delivering a liquid such as oil. Many modifications and variations may be made in structures and shapes of the components of the present invention without departing from the spirit and scope of the present invention.

As described above, according to the present invention, since the facing tooth surfaces of screw rotors are brought into contact with each other only at the pitch line, wear and restraint of the screw rotors due to the contact can be prevent from occurring. Further, the following advantages can be obtained by utilizing the contact between the screw rotors positively:

(1) It is possible to perform the traction drive by utilizing the rolling contact between the screw rotors. Specifically, it is possible to drive the single rotating shaft to rotate the two screw rotors synchronously in the opposite directions without using the timing gears. Even in this case, the screw rotors are hardly damaged.

(2) The screw rotors can be easily assembled on the basis of the contact position of the taper surfaces (the facing tooth surfaces described above). It is also easy to manage the magnitude of the clearance between the screw rotors.

(3) In the case where the screw rotors are rotated synchronously in the opposite directions due to the magnetic coupling without using the timing gears, if the screw rotors are brought into contact with each other, the taper surfaces are not brought into sliding contact, and the contact portions are not moved relatively to each other. In this manner, the taper surfaces can be brought into rolling contact smoothly with each other, and hence the respective screw rotors can be rotated stably without being fluctuated in the rotating directions.

(4) Since the clearance between the taper surfaces can be small or zero, the pump performance can be increased.

(5) A simple motor having permanent magnets and windings for rotating the permanent magnets can be used to drive the screw rotors.

In this manner, according to the present invention, the small-sized and high-performance screw pump can be obtained. Further, since the timing gears are not required, it is possible to provide the environment-friendly screw pump having features such as a compact size, oil-free, low noise, and low-drive power.

INDUSTRIAL APPLICABILITY

The present invention is applicable to a screw pump having a pair of screw rotors whose teeth have the same shape as each other and extend helically in opposite directions for drawing and discharging a fluid by rotating the intermeshing screw rotors synchronously in opposite directions.

The invention claimed is:

1. A screw pump, comprising:
a pair of screw rotors having teeth which are held in mesh with each other for drawing and discharging a fluid by synchronized rotations thereof in opposite directions, said teeth of said screw rotors having the same shape as each other and being coiled helically in opposite directions;

wherein said teeth of said screw rotors have taper surfaces, respectively, that face each other, and wherein each of said screw rotors has an axial tooth profile which allows said taper surfaces of said screw rotors to be in contact with each other only at a pitch line.

2. A screw pump according to claim 1, wherein:

said axial tooth profile comprises an outer circumferential section, a tooth root section, and two interconnecting sections for interconnecting said outer circumferential section and said tooth root section;

said outer circumferential section and said tooth root section are located apart from said pitch line by a substantially equal distance, respectively;

one of said two interconnecting sections comprises an inclined-line which inclines with respect to a direction perpendicular to an axial direction of said screw rotor such that a tooth width of said screw rotor becomes smaller from said tooth root section toward said outer circumferential section; and each of said taper surfaces comprises said one of said two interconnecting sections.

3. A screw pump according to claim 2, wherein a gradient of said inclined-line in a region from said pitch line to said outer circumferential section is larger than a gradient of said inclined-line in a region from said tooth root section to said pitch line.

4. A screw pump according to claim 3, wherein:

said teeth of said screw rotors have trochoid surfaces, respectively, located at opposite sides of said taper surfaces;

each of said screw rotors has a transverse tooth profile including a trochoid curve generated by a point on an outer circumferential surface of said screw rotor at companion side, or a curve similar to said trochoid curve;

the other of said two interconnecting sections corresponds to said trochoid curve or said curve similar to said trochoid curve; and each of said trochoid surfaces comprises said other of said two interconnecting sections.

5. A screw pump according to any one of claims 1 to 4, further comprising:

a pair of rotating shafts to which said screw rotors are fixed; and a pair of magnet rotors attached to said rotating shafts;

wherein said magnet rotors have the same number of magnetic poles as each other, and said magnet rotors are arranged such that unlike magnetic poles of said respective magnet rotors attract each other.

6. A screw pump according to claim 5, further comprising:

plural-phase armatures having cores and windings and being disposed radially outwardly of at least one of said magnet rotors;

wherein at least one of said magnet rotors is driven by switching currents flowing to said armatures so that said screw rotors are rotated synchronously in the opposite directions.

7. A screw pump according to any one of claims 1 to 4, further comprising:

a pair of rotating shafts to which said screw rotors are fixed; and plural pairs of magnet rotors attached to said rotating shafts;

wherein said magnet rotors have the same number of magnetic poles as each other with respect to each pair of said magnet rotors, and said plural pairs of said magnet rotors are arranged such that unlike magnetic poles of said respective magnet rotors attract each other.

8. A screw pump according to claim 1, wherein:

said teeth of said screw rotors have trochoid surfaces, respectively, that face each other; and said trochoid surfaces are kept out of contact with each other.

9. A method of operating a screw pump having a pair of screw rotors whose teeth have the same shape as each other and are coiled helically in opposite directions, comprising:

bringing taper surfaces of said teeth of said screw rotors into contact with each other only at a pitch line; and rotating said screw rotors synchronously in opposite directions so as to draw and discharge a fluid.

* * * * *